United States Patent
Nordbruch

(10) Patent No.: US 11,938,956 B2
(45) Date of Patent: Mar. 26, 2024

(54) METHOD FOR CHECKING PERMISSIBLE USAGE OF A ROLLING CHASSIS

(71) Applicant: Robert Bosch GmbH, Stuttgart (DE)

(72) Inventor: Stefan Nordbruch, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 17/629,612

(22) PCT Filed: Jun. 9, 2020

(86) PCT No.: PCT/EP2020/065959
§ 371 (c)(1),
(2) Date: Jan. 24, 2022

(87) PCT Pub. No.: WO2021/018452
PCT Pub. Date: Feb. 4, 2021

(65) Prior Publication Data
US 2022/0242429 A1    Aug. 4, 2022

(30) Foreign Application Priority Data
Jul. 26, 2019  (DE) .................... 10 2019 211 121.1

(51) Int. Cl.
*B60W 50/035*    (2012.01)
*B60W 40/105*    (2012.01)
(Continued)

(52) U.S. Cl.
CPC ........ *B60W 50/035* (2013.01); *B60W 40/105* (2013.01); *B60W 40/13* (2013.01);
(Continued)

(58) Field of Classification Search
CPC .. B60W 50/035; B60W 40/105; B60W 40/13; B60W 50/085; B60W 2040/1315; B60W 2510/0638
See application file for complete search history.

(56) References Cited

U.S. PATENT DOCUMENTS 7,356,393 B1    4/2008  Schlatre et al.
2005/0131600 A1  6/2005  Quigley et al.
(Continued)

FOREIGN PATENT DOCUMENTS

DE    102010015603 A1    1/2011
DE    102016007472 A1    12/2017

OTHER PUBLICATIONS

Translation of Internatioanl Search Report for Application No. PCT/EP2020/065959 dated Oct. 6, 2020 (2 pages).

*Primary Examiner* — Ramsey Refai
(74) *Attorney, Agent, or Firm* — Michael Best & Friedrich LLP

(57) ABSTRACT

A method, device, and computer-readable medium for checking whether a rolling chassis on which a vehicle body is arranged, is being used admissibly is provided. A first specification signal is received which represent a first specification of the rolling chassis. The first specification comprises stipulations for admissible use of the rolling chassis in a motor vehicle. A motor vehicle state signal is received which represent a motor vehicle state. The rolling chassis is checked to determine whether the rolling chassis is being used in accordance with the stipulations for admissible use based on the first specification and the motor vehicle state. A result signal is generated which represent a result of the check, and the generated result signal is output.

15 Claims, 2 Drawing Sheets

(51) Int. Cl.
*B60W 40/13* (2012.01)
*B60W 50/08* (2020.01)

(52) U.S. Cl.
CPC ... *B60W 50/085* (2013.01); *B60W 2040/1315* (2013.01); *B60W 2510/0638* (2013.01)

(56) References Cited

U.S. PATENT DOCUMENTS

| | | |
|---|---|---|
| 2007/0171029 A1 | 7/2007 | Inbarajan |
| 2014/0129113 A1 | 5/2014 | Van Wiemeersch et al. |
| 2017/0221069 A1 | 8/2017 | Remboski et al. |

METHOD FOR CHECKING PERMISSIBLE USAGE OF A ROLLING CHASSIS

BACKGROUND OF THE INVENTION

The invention relates to a method for checking whether a rolling chassis, which is comprised by a motor vehicle and on which a vehicle body is arranged, is being used admissibly. The invention furthermore relates to a device, a computer program, a machine-readable memory medium, a rolling chassis, a vehicle body and a motor vehicle.

A rolling chassis generally refers to a chassis or a running gear comprising a drive motor and a drivetrain, such that a rolling chassis can travel under its own drive power.

A vehicle body is commonly arranged on such a rolling chassis.

An advantage in the use of a rolling chassis lies in particular in the fact that several possible vehicle bodies can be provided for one rolling chassis, such that different motor vehicles can be produced efficiently.

Since different motor vehicles can be constructed using one rolling chassis, a manufacturer of the rolling chassis generally provides a user of the rolling chassis with prerequisites, that is to say limits, that the user of the rolling chassis must observe.

SUMMARY OF THE INVENTION

The object on which the invention is based can be seen in providing a concept for efficiently checking whether a rolling chassis, which is comprised by a motor vehicle and on which a vehicle body is arranged, is being used admissibly.

Said object is achieved by means of the respective subject matter of the independent claims. Respectively dependent subclaims relate to advantageous refinements of the invention.

According to a first aspect, a method is provided for checking whether a rolling chassis, which is comprised by a motor vehicle and on which a vehicle body is arranged, is being used admissibly, comprising the following steps:
  receiving first specification signals which represent a first specification of the rolling chassis, wherein the first specification comprises stipulations for admissible use of the rolling chassis in a motor vehicle,
  receiving motor vehicle state signals which represent a motor vehicle state,
  checking, on the basis of the first specification and the motor vehicle state, whether the rolling chassis is being used in accordance with the stipulations for admissible use,
  generating result signals which represent a result of the check, and
  outputting the generated result signals.

According to a second aspect, a device is provided which is configured to execute all of the steps of the method according to the first aspect.

According to a third aspect, a computer program is provided which comprises commands which, when the computer program is executed by a computer, for example by the device according to the second aspect, cause said computer to execute a method according to the first aspect.

According to a fourth aspect, a machine-readable memory medium is provided in which the computer program according to the third aspect is stored.

According to a fifth aspect, a rolling chassis is provided which comprises the device according to the second aspect.

According to a sixth aspect, a vehicle body is provided which comprises the device according to the second aspect.

According to a seventh aspect, a motor vehicle is provided which comprises a rolling chassis and a vehicle body arranged on the rolling chassis and the device according to the second aspect.

The invention is based on and includes the knowledge that the above object can be achieved in that, for example after the rolling chassis has been delivered, it is checked whether the defined parameters are being adhered to in the motor vehicle comprising the rolling chassis and the vehicle body and/or during the use of the motor vehicle.

For this check, use is made firstly of the specification of the rolling chassis: the first specification.

The present motor vehicle state is secondly used.

It is correspondingly then checked whether the rolling chassis is being used in accordance with the stipulations for admissible use in the motor vehicle.

A result corresponding to the check is subsequently provided or output.

Thus, in particular, the technical advantage is achieved that a concept for efficiently checking whether a rolling chassis, which is comprised by a motor vehicle and on which a vehicle body is arranged, is being used admissibly, is provided.

According to one embodiment, the method according to the first aspect is a computer-implemented method.

Thus, for example, the technical advantage is achieved that the method can be carried out efficiently using a computer.

According to one embodiment, it is provided that second specification signals are received which represent a second specification of the vehicle body arranged on the rolling chassis, wherein the check is executed on the basis of the second specification.

Thus, for example, the technical advantage is achieved that the check can be executed efficiently. This thus means in particular that, according to this embodiment, a specification of the vehicle body, the second specification, is used for the check.

Thus, for example, the technical advantage can be achieved that it is possible to check whether the rolling chassis may also be used with the vehicle body.

According to one embodiment, it is provided that the stipulations for admissible use comprise one or more elements selected from the following group of stipulations for use: maximum motor vehicle speed, maximum motor vehicle total weight, maximum motor vehicle speed at a maximum motor vehicle total weight, setpoint position of the motor vehicle center of gravity, maximum motor vehicle payload, maximum motor vehicle dimension(s), motor vehicle type, level of automation of the motor vehicle, required vehicle components and/or vehicle functionalities, required vehicle body components and/or vehicle body functionalities, maximum usage duration of the rolling chassis, maximum usage duration of a motor vehicle component and/or motor vehicle functionality and/or vehicle body component and/or vehicle body functionality, minimum scope of maintenance, maximum maintenance time interval, parameter settings and/or parameter initializations of the required motor vehicle components and/or motor vehicle functionalities.

Thus, for example, the technical advantage is achieved that particularly suitable stipulations for use can be used.

According to one embodiment, the stipulations for use mentioned by way of example in conjunction with the rolling chassis, that is to say with the first specification, also apply analogously to the second specification of the vehicle body. This thus means in particular that the second specification may comprise stipulations for use that may comprise one or more elements selected from the corresponding group of stipulations for use.

A level of automation may for example be one of the following levels of automation: 0, 1, 2, 3 or 4.

The level of automation 0 indicates that the rolling chassis and/or the vehicle body and/or the motor vehicle are configured or designed only for manual guidance. Manual guidance means that it is always necessary for a human driver to perform the guidance of the motor vehicle. At least partially automated guidance of the motor vehicle is not possible.

The levels of automation 1 to 4 indicate that the rolling chassis and/or the vehicle body and/or the motor vehicle are configured or designed for at least partially automated guidance. The differences between the individual levels of automation 1 to 4 will be discussed below.

The wording "at least partially automated guidance" encompasses one or more of the following situations: assisted guidance (level of automation 1), partially automated guidance (level of automation 2), highly automated guidance (level of automation 3), fully automated guidance (level of automation 4).

Assisted guidance means that a driver of the motor vehicle permanently performs either the lateral or the longitudinal guidance of the motor vehicle. The respective other driving task (that is to say control of the longitudinal or of the lateral guidance of the motor vehicle) is performed automatically. This thus means that, in the case of assisted guidance of the motor vehicle, either the lateral or the longitudinal guidance is automatically controlled.

Partially automated guidance means that, in a specific situation (for example: driving on a freeway, driving within a parking space, overtaking an object, driving within a traffic lane that is defined by traffic lane markings) and/or for a certain period of time, longitudinal and lateral guidance of the motor vehicle are controlled automatically. A driver of the motor vehicle does not themself need to manually control the longitudinal and lateral guidance of the motor vehicle. The driver must however permanently monitor the automatic control of the longitudinal and lateral guidance in order to be able to intervene manually when required. The driver must be ready at all times to take over full control of the motor vehicle guidance.

Highly automated guidance means that, for a certain period of time in a specific situation (for example: driving on a freeway, driving within a parking space, overtaking an object, driving within a traffic lane that is defined by traffic lane markings), longitudinal and lateral guidance of the motor vehicle are controlled automatically. A driver of the motor vehicle does not themself need to manually control the longitudinal and lateral guidance of the motor vehicle. The driver does not need to permanently monitor the automatic control of the longitudinal and lateral guidance in order to be able to intervene manually when required. When required, a takeover prompt is output to the driver to take over the control of the longitudinal and lateral guidance, in particular with an adequate time reserve. The driver must thus potentially be capable of taking over the control of the longitudinal and lateral guidance. Limits of the automatic control of the lateral and longitudinal guidance are automatically detected. In the case of highly automated guidance, it is not possible in every initial situation to automatically bring about a minimal-risk state.

Fully automated guidance means that, in a specific situation (for example: driving on a freeway, driving within a parking space, overtaking an object, driving within a traffic lane that is defined by traffic lane markings), longitudinal and lateral guidance of the motor vehicle are controlled automatically. A driver of the motor vehicle does not themself need to manually control the longitudinal and lateral guidance of the motor vehicle. The driver does not need to monitor the automatic control of the longitudinal and lateral guidance in order to be able to intervene manually when required. Before an ending of the automatic control of the lateral and longitudinal guidance, the driver is automatically prompted to take over the driving task (control of the lateral and longitudinal guidance of the motor vehicle), in particular with an adequate time reserve. If the driver does not take over the driving task, a minimal-risk state is returned to automatically. Limits of the automatic control of the lateral and longitudinal guidance are automatically detected. In all situations, it is possible to automatically return to a minimal-risk system state.

In one embodiment, it is provided that the motor vehicle state is defined by means of one or more motor vehicle state parameters, wherein the one or more motor vehicle state parameters comprise in each case one or more elements selected from the following group of motor vehicle state parameters: present motor vehicle speed, present motor vehicle total weight, present motor vehicle speed at a present motor vehicle total weight, actual position of the motor vehicle center of gravity, present motor vehicle payload, present motor vehicle dimension(s), motor vehicle type, level of automation of the motor vehicle, present motor vehicle components and/or motor vehicle functionalities, present vehicle body components and/or vehicle body functionalities, present usage duration of the rolling chassis, present usage duration of a motor vehicle component and/or motor vehicle functionality and/or vehicle body component and/or vehicle body functionality, past scope of maintenance, past maintenance time interval.

Thus, for example, the technical advantages achieved that particularly suitable motor vehicle state parameters can be used.

According to one embodiment, it is provided that operating state signals are received which indicate an operating state of the motor vehicle, wherein the check is executed in a manner dependent on the operating state.

Thus, for example, the technical advantage is achieved that the check can be executed in a manner dependent on the operating state. Thus, in particular, the technical advantage is achieved that the check can be executed efficiently.

An operating state may for example be one of the following operating states: starting phase, stopping phase, driving phase, holding phase and off phase.

For example, it is provided that the step of checking is automatically executed in the starting phase of the motor vehicle.

For example, it is provided that the step of checking is executed automatically during a driving phase.

According to one embodiment, it is provided that check time interval signals are received which represent a check time interval for an execution of the check, wherein the check is executed in a manner dependent on the check time interval.

Thus, for example, the technical advantage is achieved that the check can be executed efficiently. In particular, the technical effect is thus achieved that the check can be executed at regular intervals in accordance with the check time interval.

This thus means in particular that the check is for example executed at regular intervals, that is to say continuously, in accordance with the check time interval.

According to one embodiment, it is provided that check demand signals are received which represent a demand for an execution of the check, wherein the check is executed in a manner dependent on the demand.

Thus, for example, the technical advantage is achieved that the check can be initiated efficiently. Furthermore, for example, the technical effect is thus achieved that the check can be triggered efficiently.

According to one embodiment, it is provided that the demand comprises a motor vehicle-internal and/or a motor vehicle-external demand for an execution of the check.

Thus, for example, the technical advantage is achieved that it is possible for the execution of the check to be triggered or initiated both internally in the motor vehicle and externally to the motor vehicle.

In the case of a motor vehicle-external demand, it is for example provided that corresponding check demand signals are received via a communication network, in particular via a wireless communication network.

In the case of a motor vehicle-internal demand, it is for example provided that corresponding check demand signals are received via a motor vehicle bus, in particular CAN bus, and/or Flexray and/or ethernet.

In one embodiment, it is provided that one, multiple or all method steps are executed internally in the motor vehicle, in particular in the rolling chassis, and/or externally to the motor vehicle.

Thus, for example, the technical advantage is achieved that the method can be implemented efficiently.

A motor vehicle-external execution means in particular that the one or more corresponding method steps are executed for example by means of a remote server, which is for example part of a cloud infrastructure.

According to one embodiment, it is provided that, if the result indicates that the rolling chassis is being used at least partially, in particular entirely, in non-accordance with the stipulations for admissible use, disablement signals are generated on the basis of the result, which disablement signals indicate which component(s) and/or functionality (functionalities) of the motor vehicle and/or of the rolling chassis and/or of the vehicle body should be disabled, wherein the generated disablement signals are output.

Thus, for example, the technical advantage is achieved that adverse effects owing to the inadmissible use can be efficiently prevented, or at least partially prevented.

For example, it is provided that the use of a drive motor of the motor vehicle should be disabled. Thus, for example, the technical advantage is achieved that it is possible to efficiently prevent the motor vehicle from being operated at all.

For example, one or more assistance systems are disabled, for example in order to prevent incorrect interventions into the brake system, for example if corresponding components are not present or are arranged incorrectly.

For example, it is provided that the use of a drive motor of the motor vehicle should be disabled if it is determined that a total weight of the motor vehicle is higher than, or higher than or equal to, a predetermined total weight threshold. It is thus advantageously possible to prevent a situation in which a brake can no longer ensure reliable braking in the presence of the total weight.

According to one embodiment, it is provided that, if the result indicates that the rolling chassis is being used at least partially, in particular entirely, in non-accordance with the stipulations for admissible use, restriction signals are generated on the basis of the result, which restriction signals indicate which component(s) and/or functionality (functionalities) of the motor vehicle and/or of the rolling chassis and/or of the vehicle body should be used further only with restriction, wherein the generated restriction signals are output.

Thus, for example, the technical advantage is achieved that adverse effects owing to inadmissible use can be prevented, in particular at least partially prevented.

According to one embodiment, it is provided that, if the result indicates that the rolling chassis is being used at least partially, in particular entirely, in non-accordance with the stipulations for admissible use, a communication message comprising the result is transmitted via a communication network to at least one network address, wherein the network address is in particular assigned to a legal authority for a further check.

Thus, for example, the technical advantage is achieved that the result can be provided efficiently.

A network address is for example assigned to a computer of a user of the rolling chassis or of the motor vehicle.

A network address is for example assigned to a mobile device of the user. The mobile device is for example a mobile telephone.

A network address is for example assigned to a server of a manufacturer of the rolling chassis.

A network address is for example assigned to a workshop or a server of a workshop.

A network address is for example assigned to a legal authority, for example the TÜV (Technischer Überwachungsverein [Technical Inspection Association]). The TÜV is in particular also a remote or vehicle-external testing entity. The legal authority thus refers in particular to a remote or vehicle-external testing entity.

For example, it is provided that the result is transmitted to multiple network addresses via the communication network.

In one embodiment, it is provided that, if the result indicates that the rolling chassis is being used at least partially, in particular entirely, in non-accordance with the stipulations for admissible use, solution signals are generated on the basis of the result, which solution signals indicate a proposed solution for solving a problem that the rolling chassis is being used at least partially, in particular entirely, in non-accordance with the stipulations for admissible use, wherein the solution signals are output.

Thus, in particular, the technical advantage is achieved that the problem can be solved efficiently.

According to one embodiment, it is provided that one or more method steps are documented, in particular are documented in a blockchain.

Thus, for example, the technical advantage is achieved that the execution of the method can also be analyzed retrospectively, that is to say after the method has been executed. In particular, documentation in a blockchain has the technical effect that falsification-proof and manipulation-proof documentation is possible.

According to one embodiment, it is provided that the method according to the first aspect is carried out or executed by means of the device according to the second aspect.

Method features emerge analogously from corresponding device features and vice versa. This thus means in particular that technical functionalities of the method according to the first aspect emerge from corresponding technical functionalities of the device according to the second aspect, and vice versa.

A chassis refers to a motor vehicle chassis. This thus means that the rolling chassis is a rolling chassis of a motor vehicle.

A vehicle body refers to a motor vehicle body.

For the German expression "Karosserie" ["vehicle body"], the terms "body" or "top hat" may also be used in English. It follows from this that the expression "Karosserie" ["vehicle body"] in German may also be substituted by the expression "Aufbau" ["superstructure"].

According to one embodiment, the expression "vehicle body" or "motor vehicle body" may be interpreted broadly. For example, according to one embodiment, the vehicle body may comprise one or more of the following components: motor vehicle seat, dashboard, gearshift lever, motor vehicle window, motor vehicle door, motor vehicle interior trim, airbag, assistance system, video camera, human-machine interface, tachometer.

The expression "vehicle body" can thus refer in the context of this description to the upper part ("top hat") of a motor vehicle, which is arranged on a chassis. The vehicle body may thus, analogously to a prefabricated part of a prefabricated house, be a component that has already been manufactured to such a degree that a finished motor vehicle, that is to say in particular a motor vehicle that is ready to drive, is formed after the vehicle body has been arranged on the rolling chassis.

According to one embodiment, a rolling chassis comprises one or more of the following components: wheel, axle, drive motor, steering system, break, frame, thermal components, battery, battery housing, sensor, in particular surroundings sensor (for example: radar sensor, lidar sensor, ultrasound sensor, magnetic field sensor, infrared sensor, video sensor), control unit (referred to as "ECU", "electronic control unit"), PC (personal computer).

According to one embodiment, the rolling chassis may thus, analogously to a prefabricated part of a prefabricated house, be a component that has already been manufactured to such a degree that a finished motor vehicle, that is to say in particular a motor vehicle that is ready to drive, is formed after the vehicle body has been arranged on the rolling chassis.

The rolling chassis thus refers in particular to the lower component in relation to the upper component (vehicle body). Thus, according to one embodiment, a finished motor vehicle, that is to say in particular a motor vehicle that is ready to drive, is formed as a result of the arrangement of the upper component (vehicle body) and lower component (rolling chassis), wherein the upper component is arranged on the lower component.

According to one embodiment, it is provided that the disablement signals are generated on the basis of the first specification and/or on the basis of the second specification and/or on the basis of the motor vehicle state.

According to one embodiment, it is provided that the restriction signals are generated on the basis of the first specification and/or on the basis of the second specification and/or on the basis of the motor vehicle state.

According to one embodiment, it is provided that the solution signals are generated on the basis of the first specification and/or on the basis of the second specification and/or on the basis of the motor vehicle state.

BRIEF DESCRIPTION OF THE DRAWINGS

Exemplary embodiments of the invention are illustrated in the drawings and will be discussed in more detail in the following description.

In the drawings.

DETAILED DESCRIPTION

Figure 1:
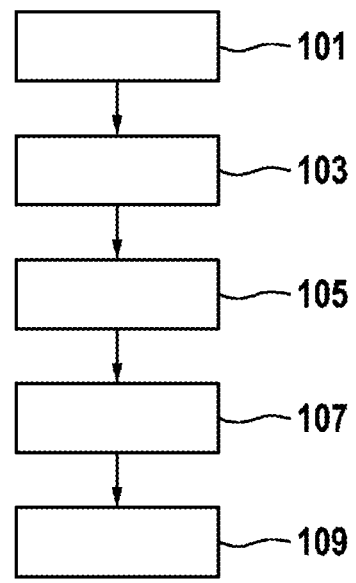
FIG. 1 shows a flow diagram of a method for checking whether a rolling chassis, which is comprised by a motor vehicle and on which a vehicle body is arranged, is being used admissibly.

FIG. 1 shows a flow diagram of a method for checking whether a rolling chassis, which is comprised by a motor vehicle and on which a vehicle body is arranged, is being used admissibly, comprising the following steps:

receiving 101 first specification signals which represent a first specification of the rolling chassis, wherein the first specification comprises stipulations for admissible use of the rolling chassis in a motor vehicle, receiving 103 motor vehicle state signals which represent a motor vehicle state, checking 105, on the basis of the first specification and the motor vehicle state, whether the rolling chassis is being used in accordance with the stipulations for admissible use, generating 107 result signals which represent a result of the check, and outputting 109 the generated result signals.

According to one embodiment, it is provided that the motor vehicle state comprises sensor data from one or more sensors of the motor vehicle.

A sensor of the motor vehicle is for example one of the following sensors: speed sensor, position sensor, in particular GPS sensor, surroundings sensor (for example: radar sensor, lidar sensor, ultrasound sensor, magnetic field sensor, infrared sensor, video sensor). In general, any sensor that can acquire data from the motor vehicle before and/or during travel may be provided.

Data comprise for example one or more of the following elements: speed data, driving behavior data, breaking behavior data, position data, acceleration behavior data.

Based on these data, it is for example possible to analyze or determine what type of vehicle body is arranged on the rolling chassis.

Based on these data, it is for example possible for the components and/or functionalities, including the possibilities and the purpose thereof, to be analyzed.

Figure 2:
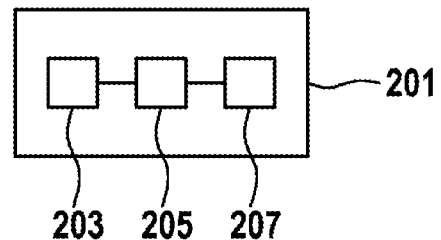
FIG. 2 shows a device.

FIG. 2 shows a device 201.

The device 201 is configured to execute all of the steps of the method according to the first aspect.

The device 201 comprises an input 203 which is configured to receive the first specification signals and the motor vehicle state signals.

The device 201 furthermore comprises a processor 205 which is configured to check, on the basis of the first specification and the motor vehicle state, whether the rolling chassis is being used in accordance with the stipulations for admissible use.

The processor 205 is furthermore configured to generate result signals that represent a result of the check.

The device 201 furthermore comprises an output 207 which is configured to output the generated result signals.

In an embodiment which is not shown, multiple processors are provided instead of the processor 205.

In general, signals are received by means of the input 203. This thus means in particular that the input 203 is configured to receive the corresponding signals.

According to one embodiment, it is provided that signals that are output are output by means of the output 207. The output 207 is thus in particular configured to output the corresponding signals.

According to one embodiment, the processor 205 is configured to generate the disablement signals and/or the restriction signals and/or the communication methods and/or the solution signals.

Furthermore, according to one embodiment, the processor 205 is configured to document one or more method steps, in particular to document these in a blockchain.

Figure 3:
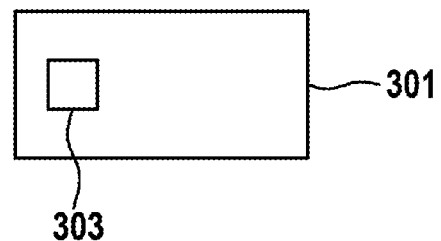
FIG. 3 shows a machine-readable memory medium.

FIG. 3 shows a machine-readable memory medium 301.

A computer program 303 is stored on the machine-readable memory medium 301. The computer program 303 comprises commands which, when the computer program 303 is executed by a computer, cause said computer to execute a method according to the first aspect.

Figure 4:
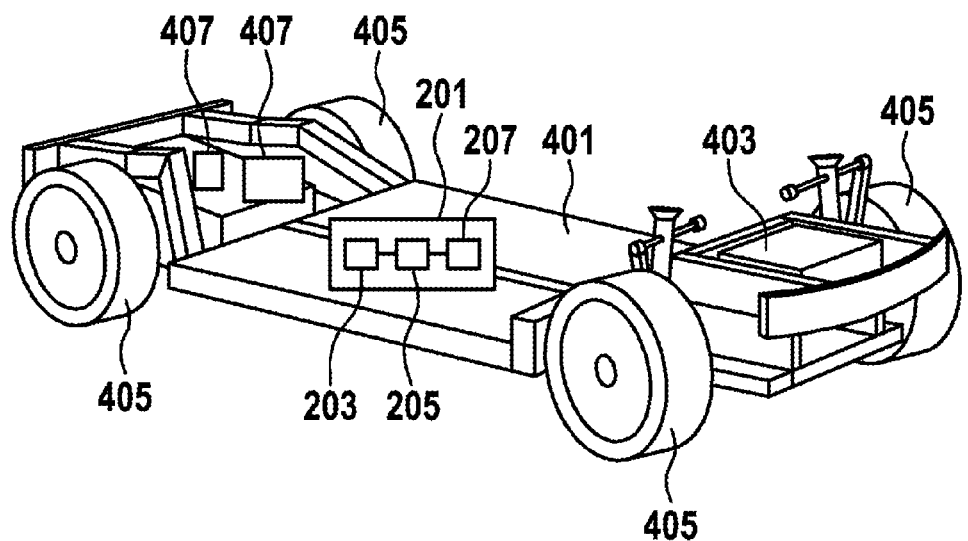
FIG. 4 shows a first rolling chassis.

FIG. 4 shows a first rolling chassis 401.

The rolling chassis 401 comprises a drive motor 403 and four wheels 405.

The rolling chassis 401 furthermore comprises multiple components 407. The components 407 may for example be one or more of the components referred to above that have been described in conjunction with the rolling chassis.

The rolling chassis 401 furthermore comprises the device 201 as per FIG. 2.

Figure 5:
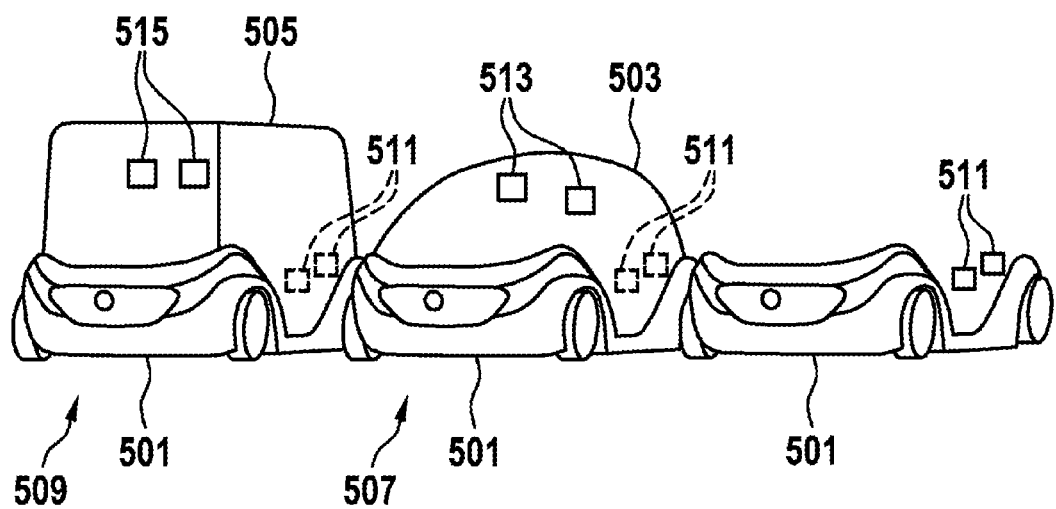
FIG. 5 shows a second rolling chassis and two different vehicle bodies.

FIG. 5 shows three examples of the same second rolling chassis 501 comprising multiple components 511. The components 511 may for example be one or more of the components referred to above that have been described in conjunction with the rolling chassis.

A second rolling chassis 501 without a vehicle body is shown at the far right in FIG. 5.

At the far left and in the center, there is shown in each case one second rolling chassis 501 with a different vehicle body 503, 505 (first vehicle body 503 and second vehicle body 505), wherein the corresponding vehicle bodies 503, 505 are arranged on the corresponding rolling chassis 501.

The first vehicle body 503 comprises multiple components 513.

The second vehicle body 505 comprises multiple components 515.

The components 513 and 515 may for example be one or more of the components referred to above that have been described in conjunction with the vehicle body.

Thus, FIG. 5 shows two motor vehicles: a first motor vehicle 507 comprising the arrangement of the second rolling chassis 501 and the first vehicle body 503, and a second motor vehicle 509 comprising an arrangement composed of the second rolling chassis 501 and the second vehicle body 505.

According to one embodiment, it may be provided that the rolling chassis 501 comprises the device 201 as per FIG. 2.

According to one embodiment, it may be provided that, in addition to or instead of the rolling chassis 501, the two vehicle bodies 503, 505 also comprise the device 201 as per FIG. 2.

According to one embodiment, it is provided that the method according to the first aspect is automatically executed after the vehicle bodies 503, 505 have been arranged on the corresponding rolling chassis 501.

In summary, the concept described here is based on the fact that, after the rolling chassis has been delivered, it is checked whether the defined parameters are being adhered to in the motor vehicle (combination of rolling chassis and vehicle body) and during use.

In another embodiment, the method is executed specifically in the case of use of exchangeable vehicle bodies.

This thus means in particular that the vehicle body is an exchangeable vehicle body.

According to one embodiment, it is provided that the checks are executed at regular intervals and/or automatically upon the starting of the motor vehicle and/or automatically during operation, that is to say in particular during travel.

According to one embodiment, the checks are initiated or triggered, that is to say instigated, by the rolling chassis.

Furthermore, according to one embodiment, it may be provided that the check is initiated or triggered from an external source, for example by a manufacturer of the rolling chassis.

In one embodiment, the step of checking is executed in the rolling chassis.

In a further embodiment, the step of checking is executed externally to the rolling chassis. For this purpose, for example, the data or signals required for this purpose are requested, that is to say retrieved, from the rolling chassis or are transmitted by said rolling chassis.

If the parameters are infringed, that is to say if the result indicates that the rolling chassis is being used at least partially, in particular entirely, in non-accordance with the stipulations for admissible use, then according to one embodiment, a functionality of the rolling chassis and/or of the motor vehicle (rolling chassis and motor vehicle) is disabled. This thus means in particular that the motor vehicle can no longer be started and used.

This applies in particular to infringements that have safety-critical effects.

If only relatively minor and/or non-safety-critical infringements are detected, then according to one embodiment it is provided that use may be permitted, wherein in particular only restricted use may be permitted. Furthermore, it may be provided that, for example, notifications of the infringements are output to the manufacturer of the rolling chassis and/or of the motor vehicle and/or to a user of the motor vehicle.

In one embodiment, it is provided that occurring infringements are communicated to a manufacturer of the rolling chassis and/or of the motor vehicle and/or to the user, who has for example assembled the motor vehicle.

In one embodiment, it is provided that, if infringements occur, advice for resolving the one or more problems is communicated.

According to one embodiment, the method, or in particular the database, is updated over a period of time. This may for example be performed off-line in a workshop or (for example automatically) online (for example from a cloud infrastructure) by the rolling chassis manufacturer and/or by the end customer themself.

In one embodiment, it is provided that the results are documented, because safety-critical infringements may also have occurred here. For example, it is provided that falsification-proof methods, such as a blockchain, are used for the documentation.

In one embodiment, it is provided that the infringements and/or the results of the analysis are transmitted to a legal authority, for example to the TUV as a motor vehicle-external testing entity. This legal authority may for example carry out or initiate further legal actions, an immobilization of the motor vehicle and/or the imposition of a penalty.

In one embodiment, it is provided that a further check analysis is performed by the legal authority for the purposes of verification. This thus means that the check may also be executed by the legal authority.

The invention claimed is:

1. A method for checking whether a rolling chassis (401, 501), of a motor vehicle, on which a vehicle body (503, 505) is arranged, is being used admissibly, the method comprising the following steps:
receiving (101), by an electronic controller of the motor vehicle, first specification signals which represent a first specification of the rolling chassis (401, 501), wherein the first specification comprises stipulations for admissible use of the rolling chassis (401, 501) in a motor vehicle (507, 509),
receiving (103), from a sensor of the motor vehicle, motor vehicle state signals which represent the motor vehicle state,
checking (105), by the electronic controller, based on the first specification and the motor vehicle state, whether the rolling chassis (401, 501) is being used in accordance with the stipulations for admissible use,
generating (107), by the electronic controller, result signals which represent a result of the check,
outputting (109), by the electronic controller, the generated result signals, and
controlling, by the electronic controller, operation of the motor vehicle based on the result of the check.

2. The method as claimed in claim 1, wherein second specification signals are received which represent a second specification of the vehicle body (503, 505) arranged on the rolling chassis (401, 501), wherein the check is executed on the basis of the second specification.

3. The method as claimed in claim 1, wherein the stipulations for admissible use comprise one or more elements selected from the following group of stipulations for use: maximum motor vehicle speed, maximum motor vehicle total weight, maximum motor vehicle speed at a maximum motor vehicle total weight, setpoint position of the motor vehicle center of gravity, maximum motor vehicle payload, maximum motor vehicle dimension(s), motor vehicle type, level of automation of the motor vehicle (507, 509), required vehicle components and/or vehicle functionalities, required vehicle body components and/or vehicle body functionalities, maximum usage duration of the rolling chassis (401, 501), maximum usage duration of a motor vehicle component and/or motor vehicle functionality and/or vehicle body component and/or vehicle body functionality, minimum scope of maintenance, maximum maintenance time interval, parameter settings and/or parameter initializations of the required motor vehicle components and/or motor vehicle functionalities.

4. The method as claimed in claim 1, wherein the motor vehicle state is defined by means of one or more motor vehicle state parameters, wherein the one or more motor vehicle state parameters comprise in each case one or more elements selected from the following group of motor vehicle state parameters: present motor vehicle speed, present motor vehicle total weight, present motor vehicle speed at a present motor vehicle total weight, actual position of the motor vehicle center of gravity, present motor vehicle payload, present motor vehicle dimension(s), motor vehicle type, level of automation of the motor vehicle (507, 509), present motor vehicle components and/or motor vehicle functionalities, present vehicle body components and/or vehicle body functionalities, present usage duration of the rolling chassis (401, 501), present usage duration of a motor vehicle component and/or motor vehicle functionality and/or vehicle body component and/or vehicle body functionality, past scope of maintenance, past maintenance time interval.

5. The method as claimed in claim 1, wherein operating state signals are received which indicate an operating state of the motor vehicle (507, 509), wherein the check is executed in a manner dependent on the operating state.

6. The method as claimed in claim 1, wherein check time interval signals are received which represent a check time interval for an execution of the check, wherein the check is executed in a manner dependent on the check time interval.

7. The method as claimed in claim 1, wherein check demand signals are received which represent a demand for an execution of the check, wherein the check is executed in a manner dependent on the demand.

8. The method as claimed in claim 7, wherein the demand comprises a motor vehicle-internal and/or a motor vehicle-external demand for an execution of the check.

9. The method as claimed in claim 1, wherein one, multiple or all method steps are executed internally in the motor vehicle.

10. The method as claimed in claim 1, wherein, if the result indicates that the rolling chassis (401, 501) is being used at least partially in non-accordance with the stipulations for admissible use, disablement signals are generated on the basis of the result, which disablement signals indicate which component(s) and/or functionality (functionalities) of the motor vehicle (507, 509) and/or of the rolling chassis (401, 501) and/or of the vehicle body (503, 505) should be disabled, wherein the generated disablement signals are output.

11. The method as claimed in claim 1, wherein, if the result indicates that the rolling chassis (401, 501) is being used at least partially in non-accordance with the stipulations for admissible use, restriction signals are generated on the basis of the result, which restriction signals indicate which component(s) and/or functionality (functionalities) of the motor vehicle (507, 509) and/or of the rolling chassis (401, 501) and/or of the vehicle body (503, 505) should be used further only with restriction, wherein the generated restriction signals are output.

12. The method as claimed in claim 1, wherein, if the result indicates that the rolling chassis (401, 501) is being used at least partially in non-accordance with the stipulations for admissible use, a communication message comprising the result is transmitted via a communication network to at least one network address, wherein the network address is assigned to a legal authority for a further check.

13. The method as claimed in claim 1, wherein, if the result indicates that the rolling chassis (401, 501) is being used at least partially in non-accordance with the stipulations for admissible use, solution signals are generated on the basis of the result, which solution signals indicate a proposed solution for solving a problem that the rolling chassis (401, 501) is being used at least partially in non-accordance with the stipulations for admissible use, wherein the solution signals are output.

14. The method as claimed in claim 1, wherein one or more method steps are documented in a blockchain.

15. A non-transitory computer-readable medium (301) containing instructions that when executed by a computer cause the computer to check whether a rolling chassis (401, 501), of a motor vehicle, on which a vehicle body (503, 505) is arranged, is being used admissibly, by:
receiving (101) first specification signals which represent a first specification of the rolling chassis (401, 501), wherein the first specification comprises stipulations for admissible use of the rolling chassis (401, 501) in the motor vehicle (507, 509), receiving (103) motor vehicle state signals, from a sensor of the motor vehicle, which represent a motor vehicle state, checking (105), on the basis of the first specification and the motor vehicle state, whether the rolling chassis (401, 501) is being used in accordance with the stipulations for admissible use, generating (107) result signals which represent a result of the check, outputting (109) the generated result signals, and controlling operation of the motor vehicle based on the result of the check.

\* \* \* \* \*